April 15, 1969   J. FORSTER ET AL   3,439,254
SINGLE PHASE VOLTAGE CONVERTER
Filed July 7, 1966

Inventor:
Johannes Förster
Ernst Golde
By: Spencer & Kaye
Attorneys

United States Patent Office 3,439,254
Patented Apr. 15, 1969

3,439,254
SINGLE PHASE VOLTAGE CONVERTER
Johannes Forster and Ernst Golde, Berlin, Germany, assignors to Licentia Patent-Verwaltungs-G.m.b.H., Frankfurt am Main, Germany
Filed July 7, 1966, Ser. No. 563,412
Claims priority, application Germany, July 7, 1965, L 51,062
Int. Cl. H02m 7/78; H03b 5/18
U.S. Cl. 321—45                                     5 Claims

ABSTRACT OF THE DISCLOSURE

A converter for feeding single phase voltage of higher frequency to a load which operates by charging and discharging capacitors in resonant fashion. Several resonant circuit capacitors are charged by way of choke coils and controllable current converter devices from a source of D.C. voltage tapped in its center and are also discharged through several controllable current converter devices. The controlled current converter devices are so arranged and controlled with a phase displacement that an increased frequency is produced within the load current circuit.

---

The present invention relates generally to converters, and more particularly, to a circuit arrangement for providing single-phase voltage of higher frequency.

Such voltages are needed, for example, in the induction heating field. Since only single-phase or three-phase low frequency electric mains are generally available, and possibly there may exist only the one D.C. network, it is necessary to provide circuit arrangements which produce a single-phase voltage of higher frequency from these voltages.

Converters are frequently used for this purpose which have mercury vapor tubes or controllable semiconductor devices which include a rectifier and a self-excited inverter (converter with D.C. intermediary circuits).

Because of the recovery-time in the current converter tubes which are used there is an upper frequency limit imposed upon the inverter of such a converter, and the higher the power factor, the lower will be this upper frequency limit.

For a single-phase inverter in the known bridge connection it is necessary that for the period of the mains frequency at a phase angle, for example of 45°, which corresponds to a power factor of 0.707, at least eight times the recovery-time must be provided. If it is desired to operate at higher power factors, then the period of the mains frequency must be increased correspondingly.

Previously-proposed circuit arrangements are known which provide for an increase of the mains frequency of the inverter beyound the values indicated. These circuits include resonant circuit inverters in which a choke is additionally connected to the resonant circuit which includes a capacitor and an inductance. During the magnetic reversal the capacitor is charged from a voltage source by one or several controllable current converter devices and by one or more inductances. Although such a circuit arrangement provides a considerable advance over the known inverters and also makes it possible to provide a higher frequency, it is not fully satisfactory. Since the polarity of the choke is changed twice within each period, there will be a zero current pause which will occur twice in the load circuit within each period. While the first zero current pause is desirable since one must not fall below the recovery-time of the controllable current converter device which serves for charging the capacitor, the second zero current pause is useless and merely reduces the extent of the operating frequency which can be attained.

With this in mind it is a main object of the present invention to overcome the defects of the prior art.

Another object of the present invention is to provide a circuit arrangement for producing a single-phase voltage of higher frequency which makes it possible to provide operating frequencies which are approximately twice as high as those compared with a single-phase inverter in a bridge connection, and to do this in a simple manner.

These objects and others ancillary thereto are accomplished in accordance with preferred embodiments of the invention wherein a converter is provided for feeding a single-phase load or consumer and which operates by charging and discharging a capacitor in resonant fashion. A resonant circuit capacitor is provided to which there is the series connection of a voltage source, a charging choke, and a controllable current converter device for charging as well as a series connection of a resonant circuit inductance, and a controllable current converter device for discharging, to which a non-controllable current converter device is connected in parallel and with opposite polarity.

According to a further feature of the present invention the frequency within the load circuit can be increased as desired because several resonant circuit capacitors are provided which are alternately charged via charging chokes and two controllable current converter devices each from two equi-directional series-connected voltage generators and they are discharged via two controllable current converter devices each. The current converter devices are controlled having such a phase displacement that there is produced an increased frequency within the load circuit. Non-controllable current converter devices are then no longer required.

While a similar circuit arrangement has already been proposed in which there are several resonant circuit capacitors which are charged via charging chokes and controllable current converter devices from a source of D.C. current tapped in its center, these resonant circuit capacitors are discharged via circuit chokes.

However, because of the leakage characteristic of circuit chokes this proposed circuit arrangement can be designed only relatively inaccurately so that it is not suitable for higher operating frequencies because this inaccuracy becomes progressively more apparent as the operating frequency increases.

Additional objects and advantages of the present invention will become apparent upon consideration of the following description when taken in conjunction with the accompanying drawings in which.

Figure 1:
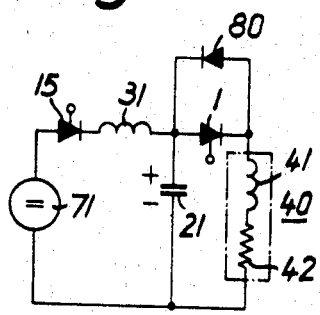
FIGURE 1 is a circut diagram of a converter constructed in accordance with the present invention.

With more particular reference to the drawings, the converter shown in FIGURE 1 has a resonant circuit capacitor 21 which is resonantly charged from a voltage source 71 via a controllable current converter device 15 and a charging choke 31.

After a second controllable current converter device 1 is placed into its conducting condition at time $t=0$, the resonant circuit capacitor 21 discharges through load circuit 40 which includes a resonant circuit inductance 41 and an ohmic resistance 42. At $t_1$ the sinusoidal current $i_1$ which flows through the current converter device 1 and the load 40, becomes zero so that the controllable current converter device 1 cuts off. During this time, the capacitor 21 is recharged to the opposite polarity. The now negative-turning current flows through the load 40 and through the non-controllable current converter device 80 and thus charges the capacitor 21 again to its original polarity. At $t_2$ this current becomes zero and the current converter device 80 cuts off. During the entire recharging time, device 1 is reverse biassed. Since the resonant circuit formed by the capacitor 21 and the load 40 is subject to losses for example at resistance 42, the voltage of the capacitor is lower at $t_2$ than at $t=$zero. That is why at $t_2$ the controllable current converter device 15 is fired in order to charge the capacitor 21 from the voltage source 71 up to the original voltage level. This means that a zero current pause occurs in the load 40 from $t_2$ to $t_3$, which is extended by the recovery time of the controllable current converter device 15.

Figure 2:
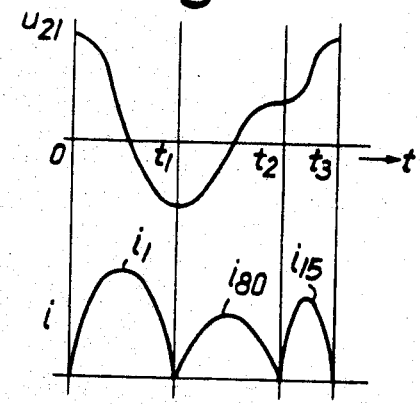
FIGURE 2 is a time plot showing the current and voltage characteristics for the converter of FIGURE 1.

These conditions are illustrated in FIGURE 2 from which it can be seen that it is necessary to provide an operating period for the circuit arrangement which amounts to 3 or 4 times the recovery time.

Figure 3:
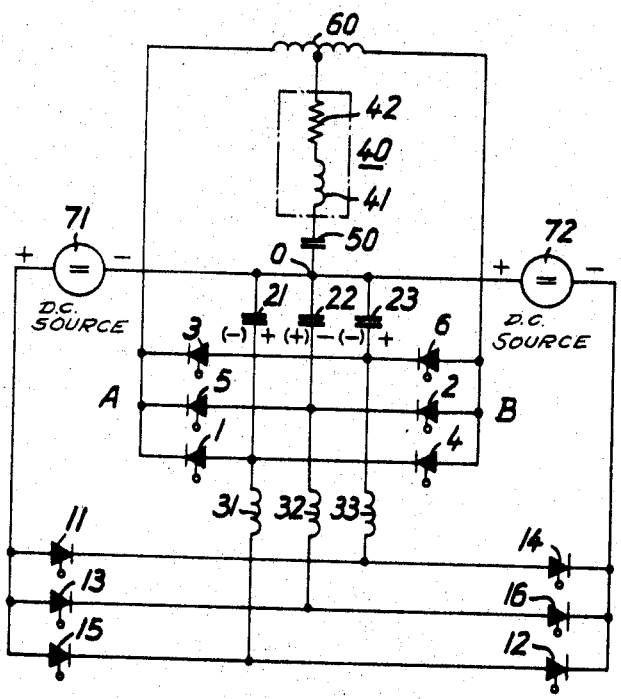
FIGURE 3 is a circuit diagram of a converter in accordance with the present invention, wherein several resonant circuit capacitors are provided for increasing the frequency within the load circuit.

A further feature of the present invention is illustrated in FIGURE 3 which includes a voltage source in the form of two voltage producing units or generators 71 and 72 which have four voltage source points and are connected in series and equidirectional with regard to polarity. Also included are three capacitors 21, 22 and 23, and three charging chokes 31, 32 and 33. Further included are two groups of three controllable current converter devices each, 11, 13, 15, and 12, 14, 16, respectively, which serve for charging the capacitors. Also, there are two groups of three controllable current converter devices each 1, 3, 5, and 2, 4, 6, respectively, which serve for discharging the capacitors. There is an inductance coil 60 which is provided with a center tap and a voltage compensating capacitor 50 and a load 40 which includes a resistance 42 and an inductance 41.

The capacitors 21, 22 and 23 are connected on one side with the connecting point of the two voltage generators 71 and 72 and on the other side are each connected with one charging choke 31, 32 and 33, respectively, and with the two groups of controllable current converter devices 11, 13, 15, and 12, 14, 16, respectively, which serve for charging the capacitors. The converter device group 11, 13, 15 is, in turn, connected with the D.C. generator 71 and the converter device group 12, 14, 16 is connected with the D.C. generator 72. The load 40 is connected to the center tap of the inductance coil 60, and via the voltage compensating capacitor 50 to the junction of the two D.C. generators 71 and 72. The ends of the inductance coil 60 are connected via the two groups of controllable current converter devices 1, 3, 5, and 2, 4, 6, which serve for the discharge of the capacitors, with the junctions between the capacitors 21, 22, 23 and the charging chokes 31, 32, 33.

The charge choke coil (31 or 32, 33, respectively) prevents the flow of excessively high currents, during charging of an associated capacitor. The size of the choke coil is so selected that the charging process occurring thereover (in FIGURE 2 $i_{15}$ from $t_2$ to $t_3$; in FIGURE 4 the currents $i_{11}$ to $i_{16}$) is completed before the controllable current converter device is fired for discharge.

The operation of this circuit will now be explained: The capacitors 21, 22, 23 are assumed to be charged to the polarity indicated in FIGURE 3, the reference point O is the potential of the capacitor neutral point. At the time $t=0$, the current converter device 1 is placed into its conducting condition by means of a control device, which is not shown, so that capacitor 21 is discharged in resonant fashion via the inductance coil 60, the compensating capacitor 50 and the load 40. When the load current becomes zero, the current converter device 2 is rendered conductive so that the capacitor 22 is now discharged via the load 40 and a current having the opposite direction will then flow in the load 40. Also, the current converter device 12 is rendered conductive and the capacitor 21 is recharged in resonant fashion to the polarity indicated in parentheses. When current converter device 2 becomes conductive, the voltage at capacitor 22 is greater than that at capacitor 21 because the latter could not oscillate to its nominal value because of the damping within the return oscillator or feed-back circuit. The inductance coil 60 is provided for preventing the current converter device 1 from being forward-biassed and receiving current. At the time current converter device 2 is rendered conductive, pursuant to the inductance ratio between inductance 41 and inductance coil 60, it receives a part of the load voltage and incorporates it in double the amount to the current circuit via the current converter device 1 in such a manner that the latter is reverse-biassed.

The charging and discharging operation is now repeated while the capacitors 21, 22, 23, and the current converter devices 1, 3, 5; 2, 4, 6, and 11, 13, 15; 12, 14, 16, are cyclically operated. When the load current flowing over the current converter device 2 becomes zero, devices 3 and 13 will be rendered conductive. When the load current flowing through device 3 becomes zero, device 4 and device 14 will be rendered conductive. The operation continues in a corresponding manner. As can be seen an alternating current flows through the load 40 which flows successively over the controllable current converter devices 1, 2, 3, 4, 5, and 6.

Figure 4:
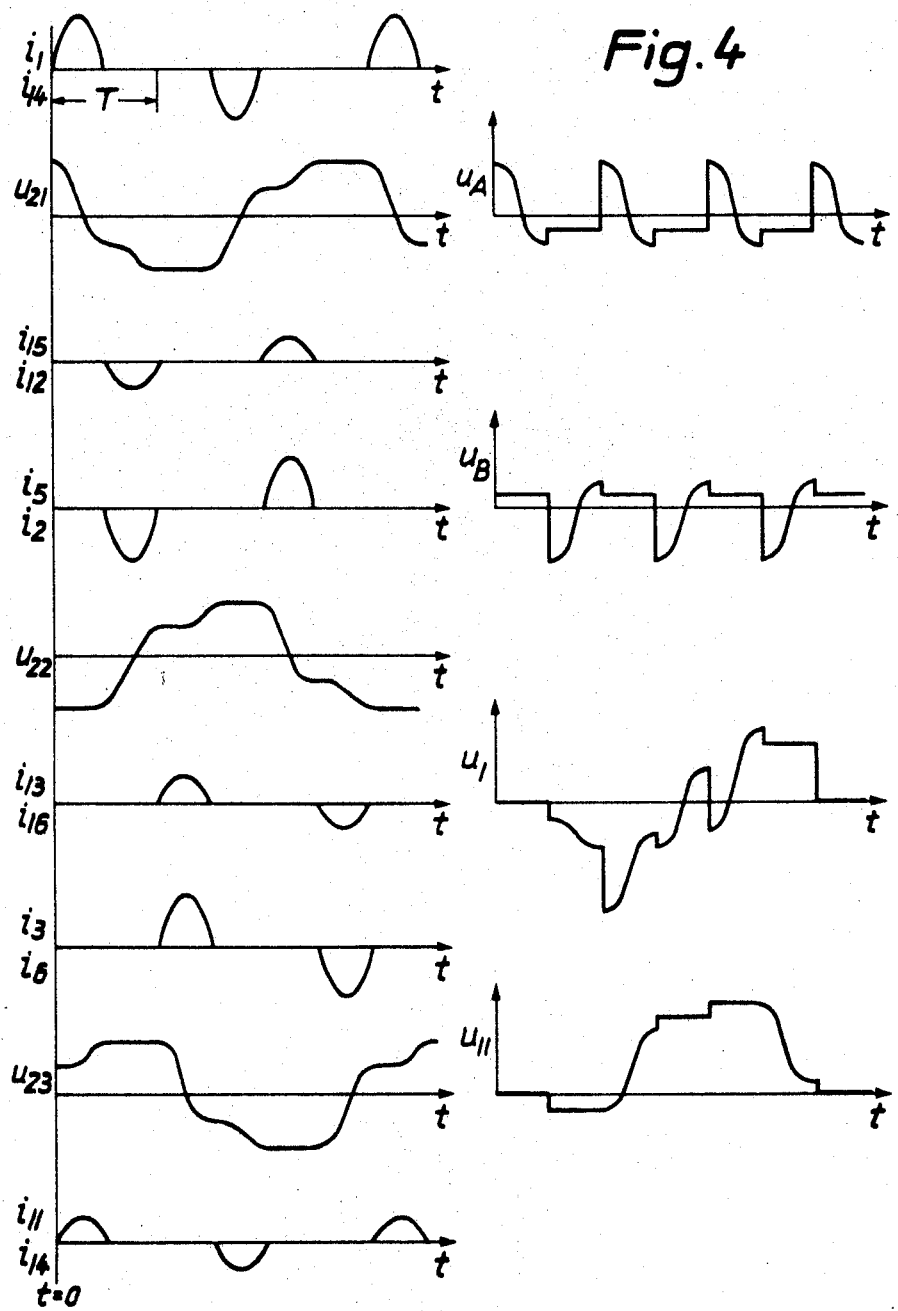
FIGURE 4 is a group of time plots for the current and voltage characteristics of the converter shown in FIGURE 3.

FIGURE 4 shows the coordination between the current and voltage curves over the most important elements of the converter shown in FIGURE 3. For a circuit arrangement having three capacitors as shown in FIGURE 3, the operation will be explained. Because of the controllable current converter devices 1 through 6 which serve for discharging the capacitors 21 through 23, there would have to be provided an operating period which amounts only to about 0.8 times the recovery-time of the above-mentioned current converter devices.

Because of the controllable current converter devices 11 to 16 which serve to charge capacitors 21 to 23, there would have to be provided an operating period which amounts to about 1.5 times the recovery-time of the above-mentioned current converter devices. If there is used as a basis a discharge time of 30 milliseconds, it is possible with the circuit arrangement shown in FIGURE 3 to attain an operating frequency of over 20 kilocycles per second. By increasing the number of capacitors and controllable current converter devices used any desired increase of the operating frequency is possible. The prerequisite therefor is merely that the number of capacitors be an odd integer equal to or larger than 3 so that positive and negative current half-waves alternately flow over the load 40. By increasing the number of capacitors to five, for example, the required operating period is reduced to about 0.6 times the recovery time of the controllable current converter devices so that there is possible an operating frequency of over 55 kilocycles per second under the same conditions outlined before.

Figure 5:
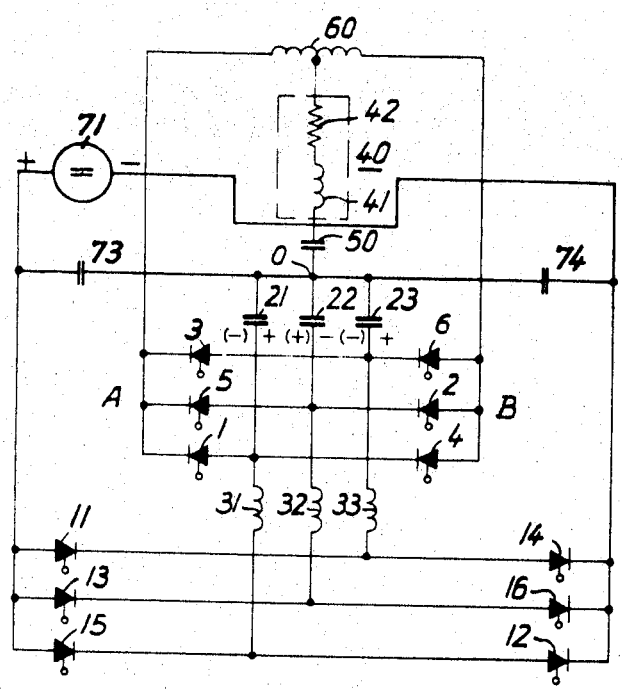
FIGURE 5 is a circuit diagram of a converter, according to the invention, showing a voltage source bridged by two series-connected capacitors.

In the arrangement of FIGURE 3 there are two individual voltage generators 71 and 72 having four voltage source points, which are used as a single voltage source. Generally, the voltage source will be available in the form of a single battery, generator, or rectifier which is supplied from A.C. mains or from three-phase mains, so that what can be provided, instead of the two voltage generators shown in FIGURE 3, are two series-connected capacitors 73, 74 which are joined at the output of a single voltage generator 71, as shown in FIGURE 5 thus providing four voltage source points.

Figure 6:
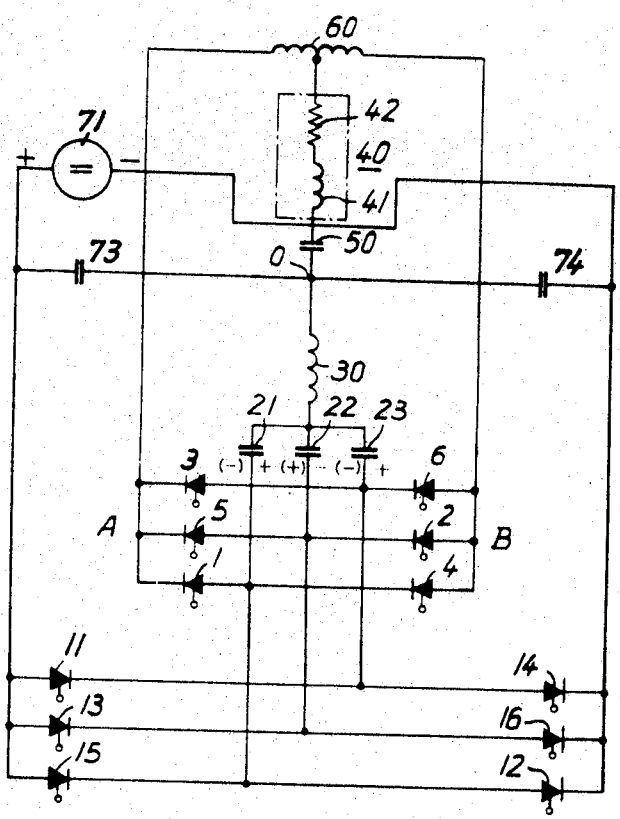
FIGURE 6 is a circuit diagram of a modified embodiment of the converter shown in FIGURE 5.

In accordance with a further feature of the invention the individual or separate charging chokes 31, 32 and 33 are replaced by a single charging choke 30 which, as shown in FIGURE 6, is disposed between the neutral point of the capacitors and the center of the D.C. source.

The cited prior art arrangement column 2, beginning at line 37 providing a discharge of capacitors via chokes differs from the present invention insofar as instead of those chokes a discharge is made through rectifiers to the inductive load 40.

A circuit suitable for use controlling the diode rectifiers is shown in SCR Manual (GE) publication, 2nd edition, 1961; page 46, FIGURE 4.12.

It will be understood that the above description of the present invention is susceptible to various modifications, changes and adaptations and the same are intended to be comprehended within the meaning and range of equivalents of the appended claims.

What is claimed is:

1. A converter for supplying a single phase load in which capacitors are charged and discharged in resonant fashion comprising, in combination:
   a voltage source;
   $n$ capacitors; where $n$ is equal to at least 3;
   said voltage source having four voltage source points;
   at least two of said points being connected together to form a junction;
   each of said capacitors having one side thereof respectively connected to said junction of said two points;
   $n$ charging chokes;
   each of said charging chokes being connected to one of said capacitors, respectively;
   $2n$ controllable current converter devices for discharging;
   $2nd$ controllable current converter devices for discharging; and
   at least two of said current converter devices for discharging being connected to each of said capacitors, respectively;
   said charging chokes connecting said capacitors and said converter devices for discharging to said $2n$ converter devices for charging;
   said current converter devices for charging being connected to the two other voltage source points and said current converter devices for discharging being connected to such load;
   such load being connected to said junction and thereby completing the circuit; and
   said converter devices being arranged to be controlled with a phase displacement so that an increased frequency is produced within the load circuit.

2. A converter as defined in claim 1 wherein said voltage source includes two equidirectional series connected voltage producing units, each of said units having two of said voltage source points.

3. A converter as defined in claim 1 wherein said voltage source is bridged by two series connected capacitors, each of said capacitors having two of said voltage source points.

4. A converter as defined in claim 1 wherein said $n$ charging chokes are formed by one choke coil in common for the $n$ capacitors and connected to said junction.

5. A converter as defined in claim 1 wherein for each of said $n$ capacitors there are two controllable current converter devices for discharging arranged to be operated alternately and combined in two groups and wherein further, such load is inductive and an inductance coil including a center tap is provided between such load and the current converter devices for discharging, such load being connected to said center tap and said current converter devices for discharging being connected to the ends of said inductance coil.

References Cited

UNITED STATES PATENTS

| | | | |
|---|---|---|---|
| 3,243,729 | 3/1966 | Olson et al. | 331—117 |
| 3,316,476 | 4/1967 | Olson et al. | 321—45 |
| 3,323,076 | 5/1967 | Pelly | 331—117 |
| 3,325,720 | 6/1967 | Stumpe | 321—45 |

JOHN F. COUCH, *Primary Examiner.*

G. GOLDBERG, *Assistant Examiner.*

U.S. Cl. X.R.

320—1; 331—117